United States Patent
Shearer

(10) Patent No.: US 7,688,320 B2
(45) Date of Patent: Mar. 30, 2010

(54) METHODS AND SYSTEMS FOR TEXTURE PREFETCHING BASED ON A MOST RECENTLY HIT PRIMITIVE ALGORITHM

(75) Inventor: Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/535,742

(22) Filed: Sep. 27, 2006

(65) Prior Publication Data

US 2008/0074418 A1    Mar. 27, 2008

(51) Int. Cl.
*G06T 15/50* (2006.01)
*G09G 5/00* (2006.01)
(52) U.S. Cl. .................. 345/426; 345/419; 345/581
(58) Field of Classification Search ............... None
See application file for complete search history.

(56) References Cited

U.S. PATENT DOCUMENTS

| 6,111,582 | A  | * | 8/2000 | Jenkins ................. 345/421 |
| 7,012,604 | B1 | * | 3/2006 | Christie et al. ........... 345/426 |
| 7,289,118 | B2 | * | 10/2007 | Schmittler et al. ......... 345/423 |
| 2002/0118188 | A1 | * | 8/2002 | Zviaguina et al. ......... 345/421 |
| 2004/0125103 | A1 | * | 7/2004 | Kaufman et al. .......... 345/419 |

OTHER PUBLICATIONS

Wald, I., Slusallek, P., Benthin, C., and Wagner, M. 2001. Interactive Distributed Ray Tracing of Highly Complex Models. In Proceedings of the 12th Eurographics Workshop on Rendering Techniques (Jun. 25-27, 2001). S. J. Gortler and K. Myszkowski, Eds. Springer-Verlag, London.*

Badt, S., Jr. Two algorithms for taking advantage of temporal coherence in ray tracing. Visual Comput. 4 (1988), 123-132.*

Havran, V., Bittner, J., and Seidel, H. 2003. Exploiting temporal coherence in ray casted walkthroughs. In Proceedings of the 19th Spring Conference on Computer Graphics (Budmerice, Slovakia, Apr. 24-26, 2003). L. Szirmay-Kalos, Ed. SCCG '03. ACM, New York, NY, 149-155. DOI= http://doi.acm.org/10.1145/984952.984977.*

(Continued)

*Primary Examiner*—Ulka Chauhan
*Assistant Examiner*—Daniel F Hajnik
(74) *Attorney, Agent, or Firm*—Patterson & Sheridan, LLP

(57) ABSTRACT

According to embodiments of the invention ray-primitive intersection tests in may be executed in an order according to a most recently hit primitive list. Furthermore, by pre-fetching a texture which is applied to the first intersected primitive in the most recently hit primitive list, the amount of time necessary to determine the color of the primitive based on the color of the pre-fetched texture at the point a ray intersects the primitive may be reduced. The color of the primitive due to the pre-fetched texture may be used to determine the color of a pixel through which a ray passed, and the pixel may be used to render a two dimensional image from a three dimensional scene. Therefore, by reducing the amount of time to determine the color of the pixel, the amount of time necessary to render a two dimensional image form a three dimensional scene may be reduced.

17 Claims, 9 Drawing Sheets

OTHER PUBLICATIONS

Correa, W. T., Klosowski, J. T., and Silva, C. T. 2003. Visibility-Based Prefetching for Interactive Out-Of-Core Rendering. In Proceedings of the 2003 IEEE Symposium on Parallel and Large-Data Visualization and Graphics (Oct. 20-21, 2003). Parallel and large-data visualization and graphics. IEEE Computer Society, Washington, DC, 2. DOI= http:/.*

I. Wald and P. Slusallek. State-of-the-Art in Interactive Ray-Tracing. In State of the Art Reports, EUROGRAPHICS 2001.*

* cited by examiner

METHODS AND SYSTEMS FOR TEXTURE PREFETCHING BASED ON A MOST RECENTLY HIT PRIMITIVE ALGORITHM

BACKGROUND OF THE INVENTION

1. Field of the Invention

Embodiments of the invention generally relate to the field of image processing.

2. Description of the Related Art

The process of rendering two dimensional images from three dimensional scenes is commonly referred to as image processing. As the modern computer industry evolves image processing evolves as well. One particular goal in the evolution of image processing is to make two dimensional simulations or renditions of three dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three dimensional scene onto a two dimensional monitor using pixels is called rasterization. Rasterization is the process of taking a two dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three dimensional scene onto a two dimensional monitor using pixels is called ray tracing. The ray tracing technique traces the propagation of imaginary rays, rays which behave similar to rays of light, into a three dimensional scene which is to be rendered onto a computer screen. The rays originate from the eye(s) of a viewer sitting behind the computer screen and traverse through pixels, which make up the computer screen, towards the three dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two dimensional display of the computer screen, the two dimensional synthesis of the three dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of fetching a texture for primitives in an image processing system is provided. The method generally comprising: creating a most recently hit primitive list based on a first ray issued into a three dimensional scene, wherein the most recently hit primitive list indicates at least one intersected primitive in the three dimensional scene; issuing a second ray into the scene; executing ray-primitive intersection tests on the second ray in an order according to the most recently hit primitive list; and pre-fetching a first texture corresponding to the first primitive in the most recently hit primitive list intersected by the second ray.

According to another embodiment of the invention a computer readable medium is provided. The computer readable medium containing a program which, when executed, performs an operation generally comprising: creating a most recently hit primitive list based on a first ray issued into a three dimensional scene, wherein the most recently hit primitive list indicates at least one intersected primitive in the three dimensional scene; issuing a second ray into the scene; executing ray-primitive intersection tests on the second ray in an order according to the most recently hit primitive list; and pre-fetching a first texture corresponding to the first primitive in the most recently hit primitive list intersected by the second ray.

According to another embodiment of the invention, a system is provided. The system generally comprising a memory cache; and a first processing. The first processing element configured to perform the steps generally comprising: creating a most recently hit primitive list in the memory cache based on a first ray issued into a three dimensional scene, wherein the most recently hit primitive list indicates at least one intersected primitive in the three dimensional scene; issuing a second ray into the scene; executing ray-primitive intersection tests with the second ray in an order according to the most recently hit primitive list; and pre-fetching a first texture corresponding to the first primitive in the most recently hit primitive list intersected by the second ray.

DETAILED DESCRIPTION OF THE PREFERRED EMBODIMENTS

Figure 1:
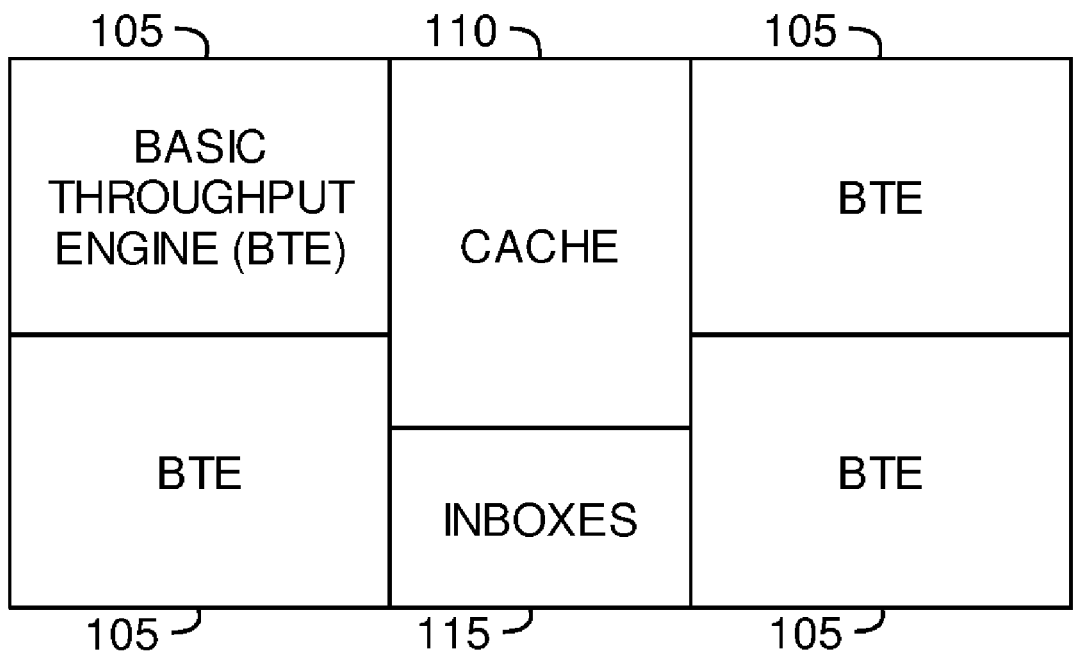
FIG. 1 illustrates a multiple core processing element, according to one embodiment of the invention.

Embodiments of the invention provide methods and apparatus for performing ray-primitive intersection tests and determining the color of a pixel through which a ray passed. According to embodiments of the invention, the order of primitives intersected by rays in a three dimensional scene or bounding volume may be tracked in a most recently hit primitive list. A vector throughput engine may execute future ray-primitive intersection tests in an order according to the order of primitives in the most recently hit primitive list.

In contrast to waiting until all ray-primitive intersection tests have completed for all primitives in the bounding volume to fetch a texture for the first intersected primitive, the texture of the first intersected primitive may be pre-fetched. The vector throughput engine may pre-fetch a texture associated with the first intersected primitive in the most recently hit primitive list while other ray-primitive intersection tests are being performed on the remaining primitives in the most recently hit primitive list. After all ray-primitive intersection tests have been completed, a determination may be made as to which primitive was intersected first in the three dimensional scene. If the first intersected primitive in the most recently hit primitive list is the first intersected primitive in the three dimensional scene, the vector throughput engine may not have to fetch the texture from memory because it was pre-fetched. The color of the texture and thus the primitive may be used to determine the color of a pixel through which a ray passed, and the pixel may be used to render a two dimensional image from a three dimensional scene. Therefore, by reducing the amount of time necessary to fetch the texture corresponding to an intersected primitive, the amount of time necessary to render a two dimensional image form a three dimensional scene may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 1 05. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
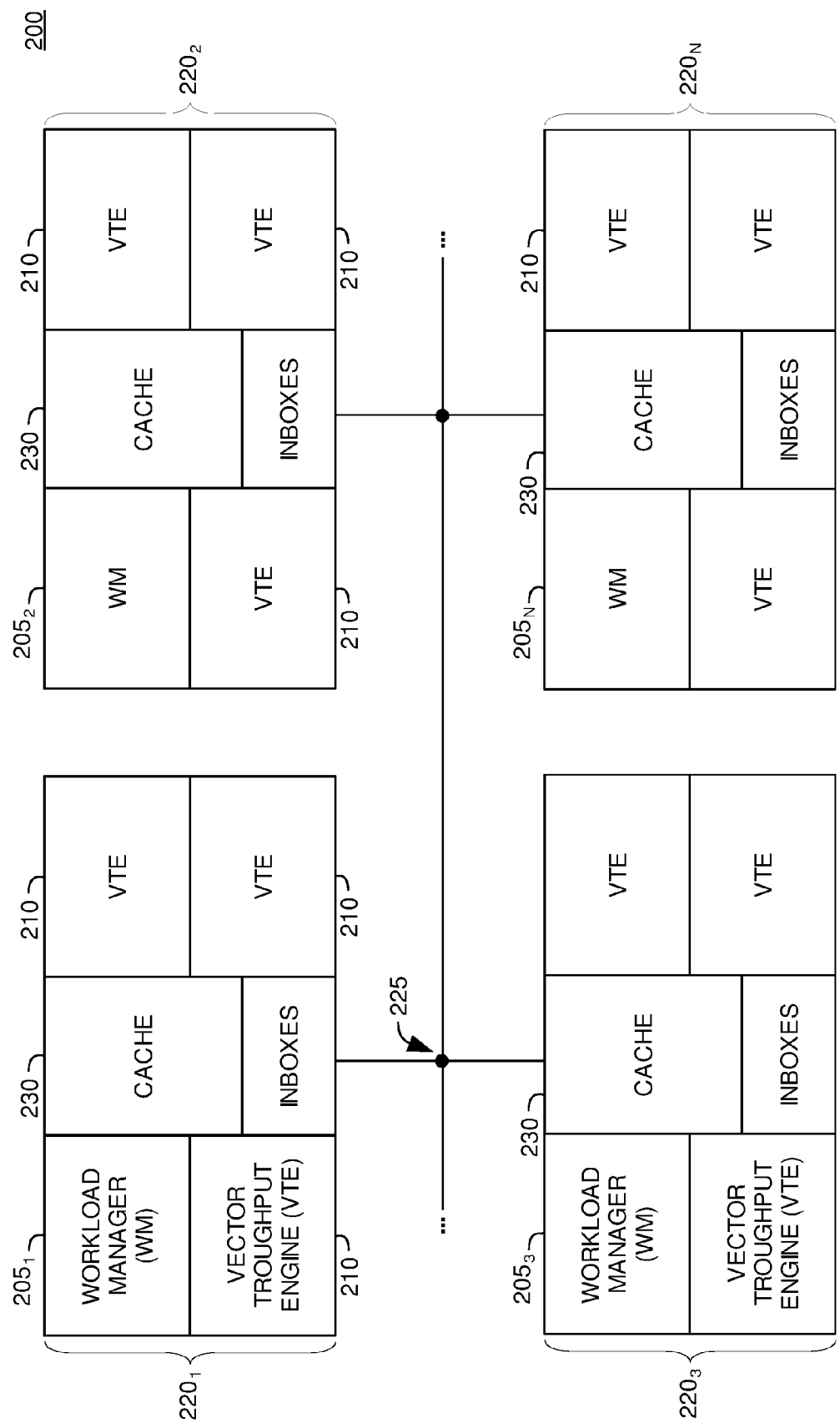
FIG. 2 illustrates a multiple core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
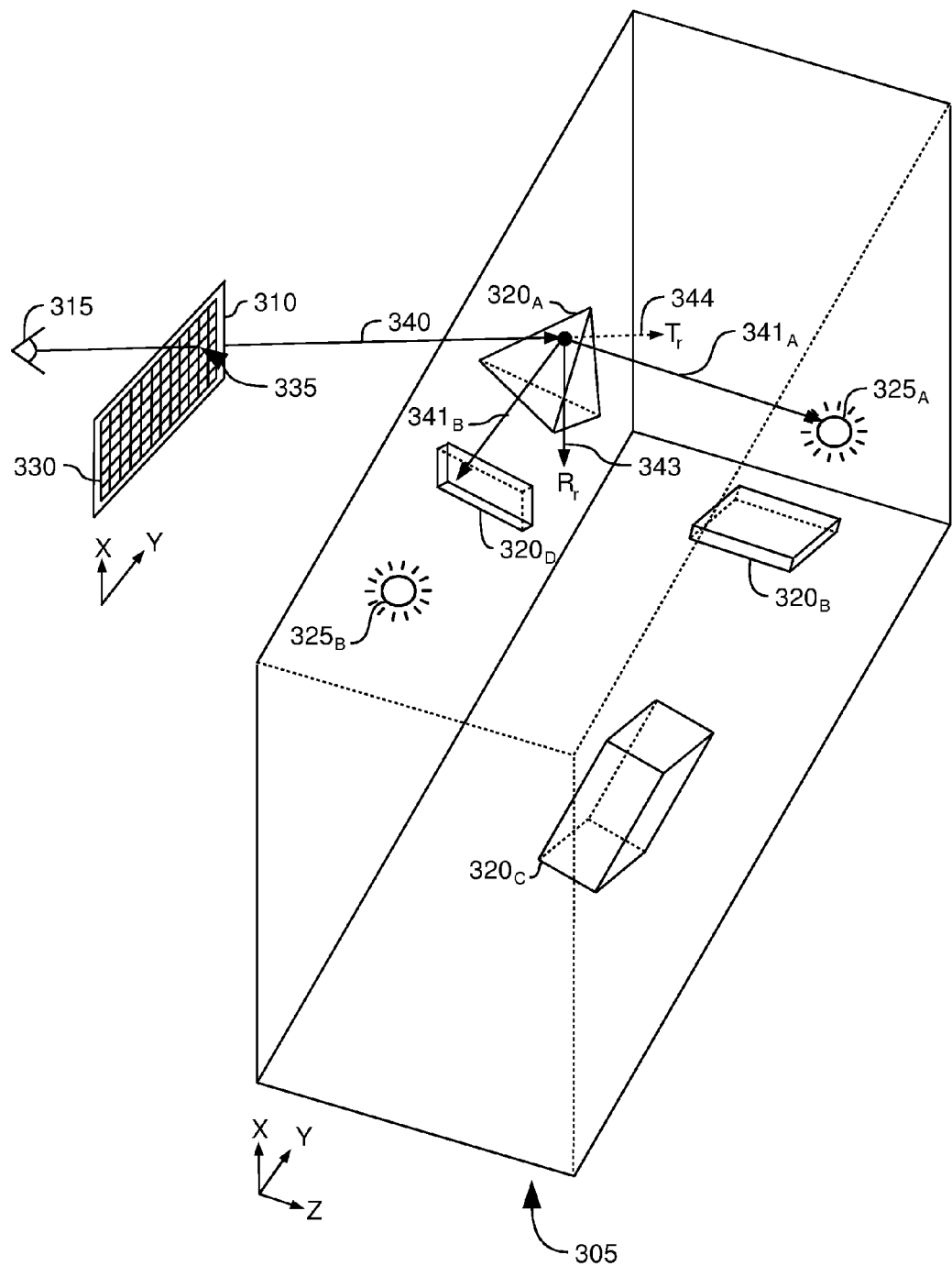
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two dimensional picture by an image processing system. The image processing system may also cause the two dimensional picture to be displayed on a monitor 310. The monitor 310 may use many pixels 330 of different colors to render the final two dimensional picture.

One method used by image processing systems to render a three dimensional scene 320 into a two dimensional picture is called ray tracing. Ray tracing is accomplished by the image processing system "issuing" or "shooting" rays from the perspective of a viewer 315 into the three dimensional scene 320. The rays have properties and behavior similar to light rays.

One ray 340, that originates at the position of the viewer 315 and traverses through the three dimensional scene 305, can be seen in FIG. 3. As the ray 340 traverses from the viewer 315 to the three dimensional scene 305, the ray 340 passes through a plane where the final two dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two dimensional picture on the monitor 310. An image processing system using a ray tracing image processing methodology to render a two dimensional picture from a three dimensional scene 305 will calculate the colors that the issued ray or rays encounters in the three dimensional scene. The image processing scene will then assign the colors encountered by the ray to the pixel through which the ray passed on its way from the viewer to the three dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary Kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three dimensional scene or world into smaller volumes (smaller relative to the entire three dimensional scene) which may or may not contain primitives. An image processing system can then use the known boundaries of these smaller volumes to determine if a ray may intersect primitives contained within the smaller volumes. If a ray does intersect a volume containing primitives, then a ray-primitive intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
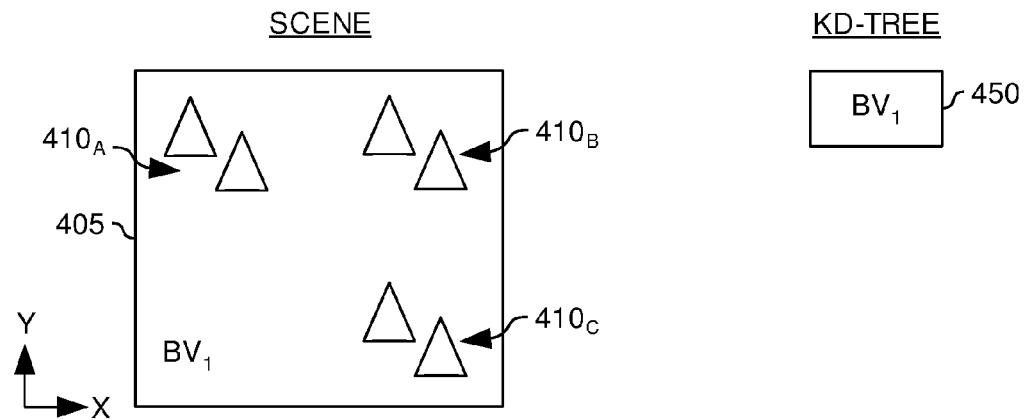
FIGS. 4A-4C illustrate a two dimensional space to be rendered by an image processing system and a corresponding spatial index created by an image processing system, according to one embodiment of the invention.
Figure 4B:
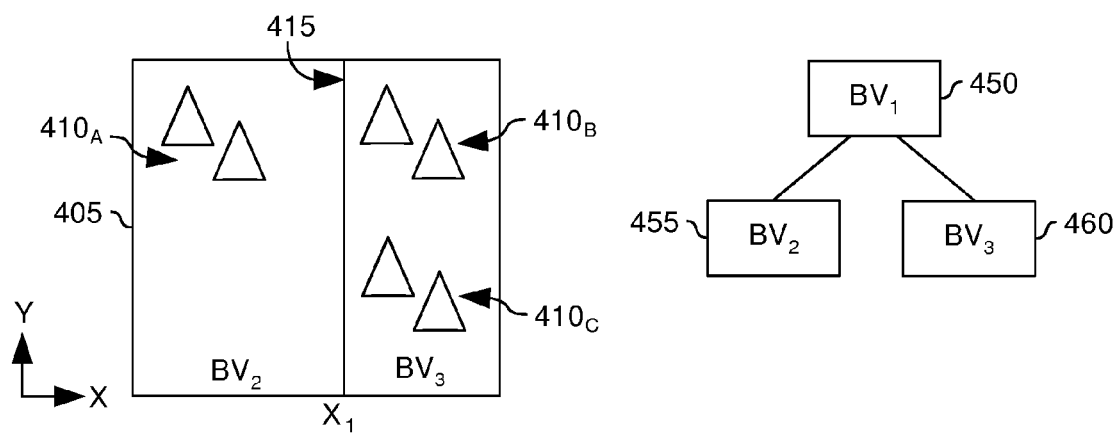
Figure 4C:
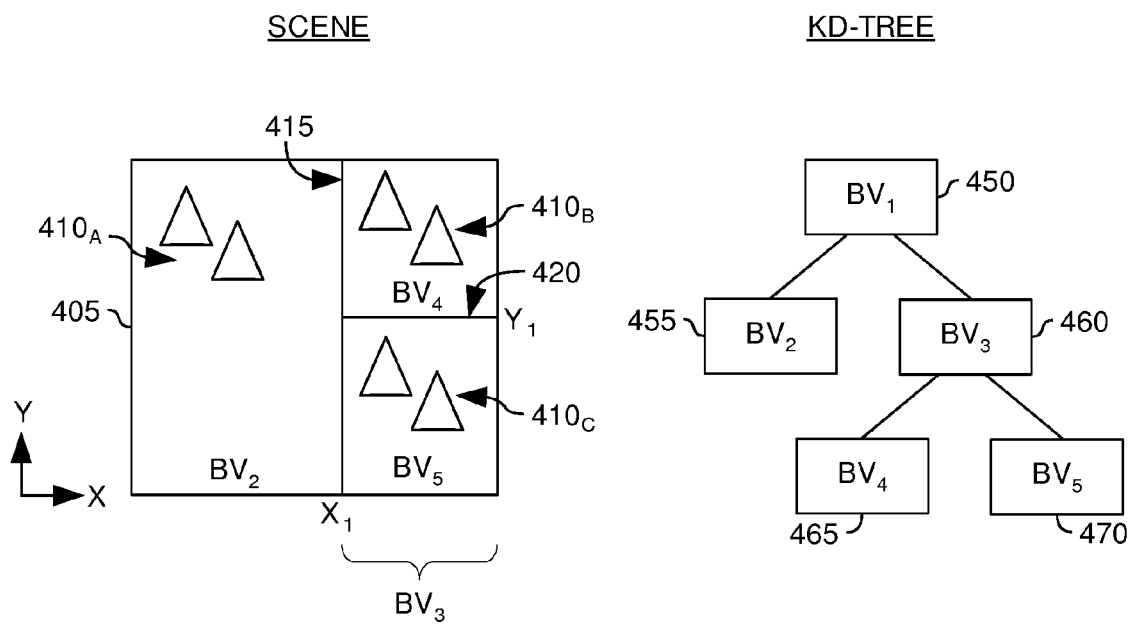

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C, splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Texture Pre-Fetching Based on a Most Recently Hit Primitive Algorithm

As described above with respect to FIG. 4, an image processing system may issue a ray into a three dimensional scene, and a workload manager 205 may traverse the ray through a spatial index. The spatial index (e.g., a kd-tree) may represent bounding volumes which partition the three dimensional scene. Once the workload manager 205 (as illustrated in FIG. 2) reaches a leaf node of the spatial index, the workload manager 205 may send information defining the ray and the leaf node to a vector throughput engine 210, and the vector throughput engine 210 may perform operations to determine if the ray strikes primitives contained within the bounding volume.

Figure 5:
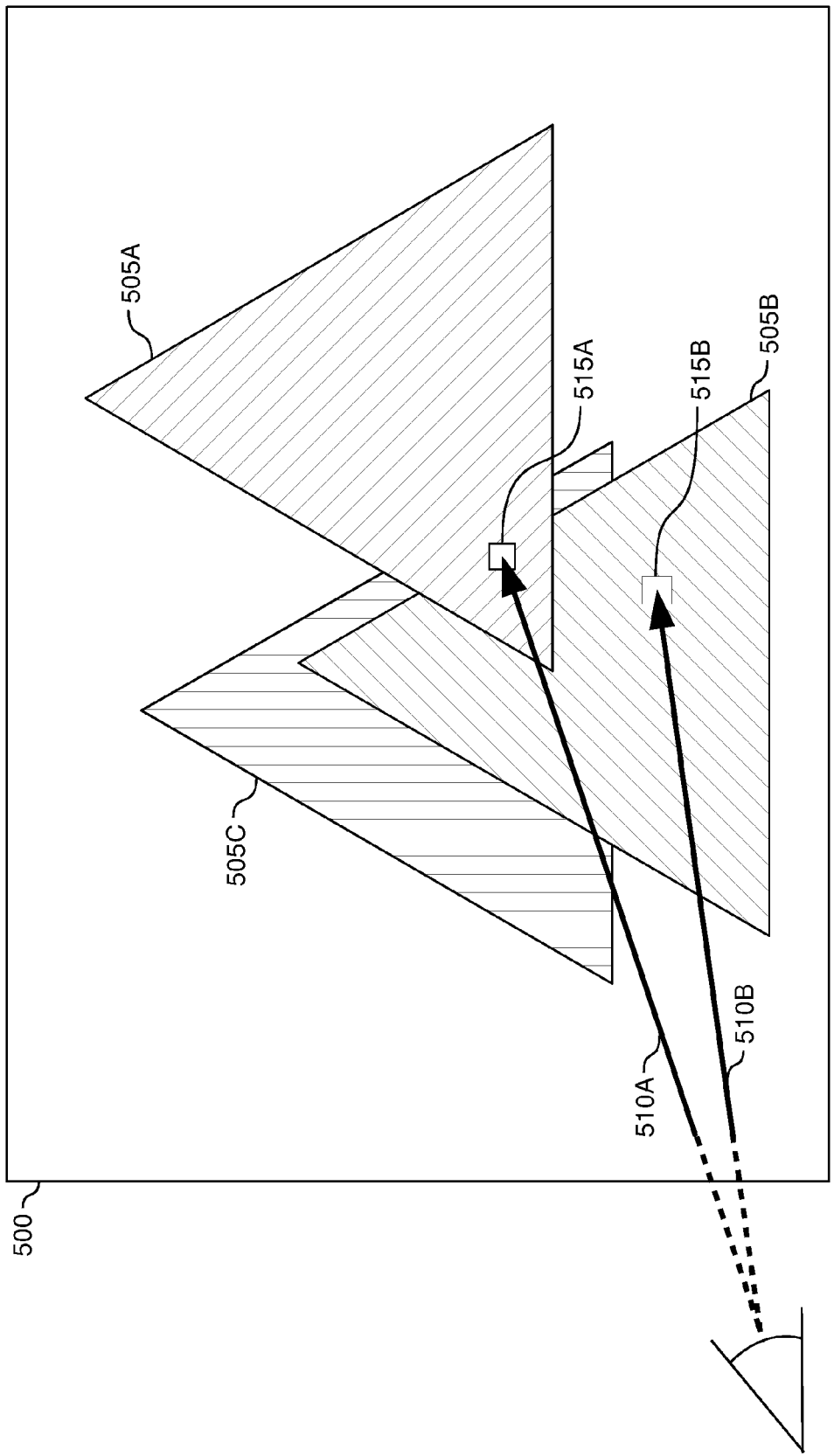
FIG. 5 illustrates primitives contained within a three dimensional scene, according to one embodiment of the invention.

For example, FIG. 5 illustrates a bounding volume 500 which contains primitives 505A-505C. Also illustrated in FIG. 5 are rays 510A and 510B. Rays 510A and 510B may have been issued by the image processing system, and intersect the bounding volume 500. Furthermore, the rays 510A and 510B may intersect primitives 505A-505C within the bounding volume 500. For example, ray 510A intersects primitive 505A at point 515A, and ray 510B intersects primitive 505B at point 515B.

In order to determine the color of a pixel in a two dimensional image rendered from the three dimensional scene, ray-primitive intersection tests may be executed by the vector throughput engine 210 for a ray 510A. The ray-primitive intersection tests for a ray 510A may be executed against every primitive 505A-505C within in a bounding volume 500. After the vector throughput engine has determined that a primitive (e.g., 505A) has been intersected by the ray 510A, and the primitive 505A is determined to be the first or the closest intersected primitive to a viewer of the three dimensional scene (e.g., the viewer 315 of FIG. 3), a texture for the primitive 505A may be loaded ("fetched") from memory. After the texture for the primitive 505A has been fetched from memory, a color of the texture at the point 515A the ray 510A intersects the primitive 505A may be determined. The color of the texture at the point the ray (e.g., 505A) intersects the primitive 505 may be the color of the pixel through which the ray passed as it was issued into the three dimensional scene by the image processing system. It should be noted, that although the texture may contribute to the color of the pixel through which the ray passed, other objects may contribute to the final color of the pixel as well (e.g., light sources, reflections, refractions, etc.). As described above with regards to FIG. 3, each pixel 335 color may be used to render the final two dimensional image 310 from the three dimensional scene 305.

A texture may be, for example, a bit map or a JPEG image which may contain many colors which together collectively create an image. The texture for a primitive may be large (e.g., several bytes of data) and the portion of the texture at the point of the ray-primitive intersection is often not reused. Therefore, it may not be efficient or beneficial to store a texture in a memory cache of the image processing system (e.g., the cache 230 of the multiple core processing element 220 illustrated in FIG. 2). It is therefore common that texture data must be loaded from memory each time it is needed by the vector throughput engine 210, and therefore not accessible in cache memory.

In some circumstances, the process of fetching the texture from memory may occur after all of the ray-primitive intersection tests have been performed, and after the determination as to which of the intersected primitives was first intersected within the three dimensional scene. Therefore, the process of loading texture from memory increases the number of processing cycles necessary to determine the color of the pixel through which the ray passed.

According to embodiments of the invention, a method of pre-fetching a texture from memory is provided such that the number of processing cycles necessary to determine the color of a pixel through which a ray passed may be reduced. For example, each ray-primitive intersection tests may take several processing cycles, and the determination as to which of the primitives the ray intersected first may take several processing cycles. Furthermore, the process of loading the texture from memory may take several processing cycles; however, in general, the process of loading the texture from memory may take fewer processing cycles than the total processing cycles required to execute the ray-primitive intersection tests and the determination of which intersected primitive was intersected first. According to one embodiment of the invention, a most recently intersected primitive list may be used to determine a texture to pre-fetch from memory while ray-primitive intersection tests are still being performed. Thus, by initiating the fetching of a texture before all ray-primitive intersection tests are complete may result in the necessary texture being loaded from memory before the ray-primitive intersection tests are complete.

Furthermore, due to a pattern of issuing rays into the three dimensional scene which the image processing system may follow, the pre-fetched texture is likely be the texture for the first intersected primitive in the scene, and therefore loading the texture after the determination of which primitive is the first intersected primitive may not be necessary. Therefore, if the correct texture was fetched from memory while the ray-primitive intersection tests were still being performed, the processing cycles necessary to fetch the texture corresponding to the first intersected primitive may not be necessary, and thus the total amount of processing cycles (i.e., the time) needed to determine the color of the pixel through which the ray passed may be reduced.

Using a most recently hit primitive is likely to reduce the processing cycles required determine the color of a pixel through which a ray passes, because the image processing system may follow a pattern for issuing rays. Due to the pattern, over a period of time rays may be issued into the scene with relatively similar trajectories which may cause the rays to follow a relatively similar path. Rays which follow a similar path often end up striking the same primitive within a bounding volume. Due to the fact that over periods of time issued rays often intersect the same primitives, a most recently hit primitive list may be accurate over the same periods of time. Thus, the pre-fetching of textures is likely to be accurate over periods of time and may consequently reduce the number of processing cycles to determine the color of a pixel over the same periods of time.

Figure 6:
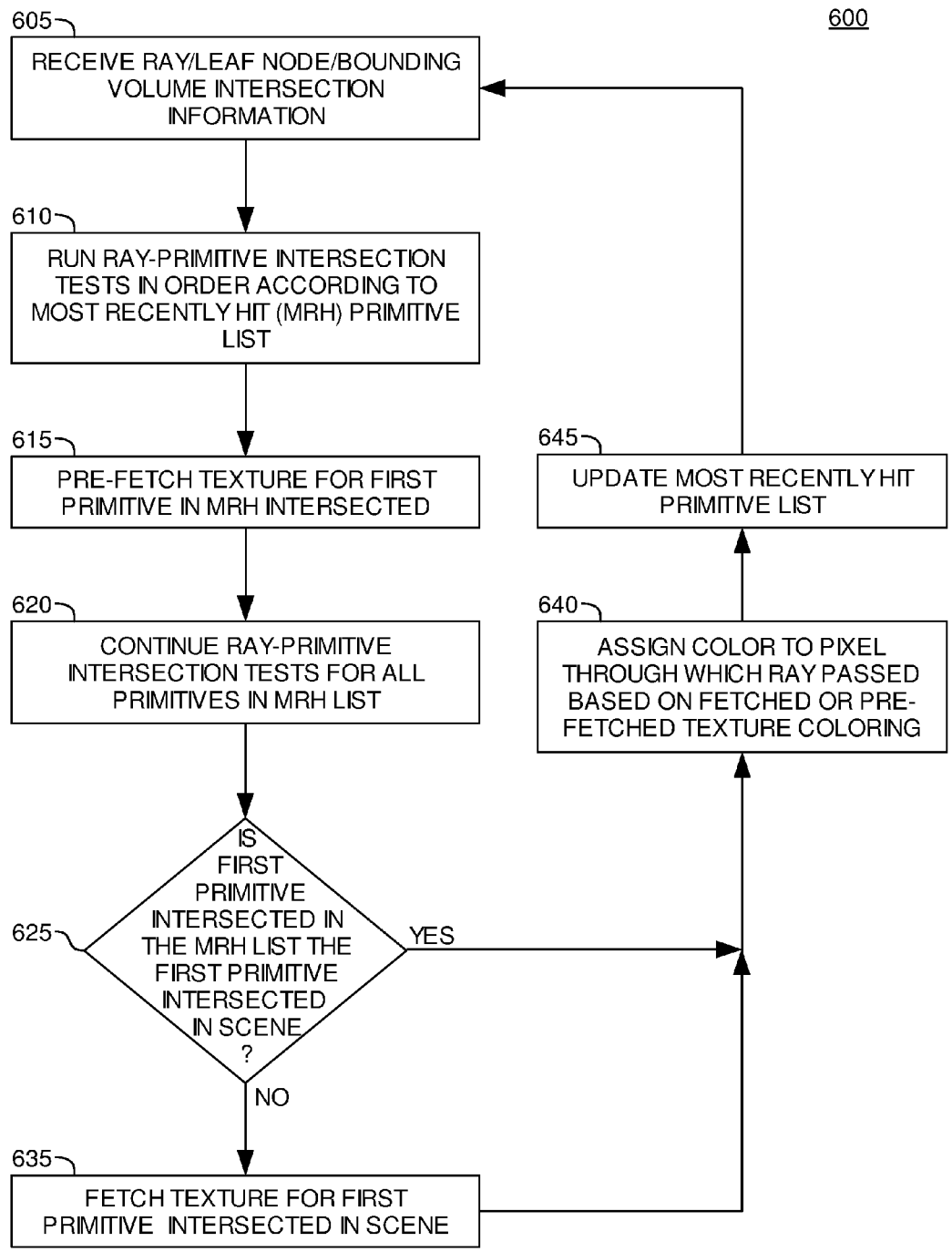
FIG. 6 is a flowchart which illustrates a method for executing ray-primitive intersection tests and determining a color value for a pixel, according to one embodiment of the invention.

FIG. 6 illustrates a method 600 of performing ray-primitive intersection tests according to a most recently intersected primitive list and pre-fetching a texture for memory, according to one embodiment of the invention. The method 600 may reduce the number of processing cycles necessary to determine the color contribution of a primitive's texture to a pixel.

The method 600 may begin at step 605 when the vector throughput engine 210 receives information relating to a ray which has been issued into a three dimensional scene. For example, the information may come from a workload manager 205 which has traversed a ray through a spatial index (e.g., the spatial index 405 created with regards to FIG. 4 above) until a leaf node of the spatial index was reached. The vector throughput engine 210 may receive information from the workload manager 205 defining the ray (e.g., the trajectory of the ray) and defining the leaf node which was reached (e.g., the bounding volume corresponding to the leaf node). For example, the vector throughput engine may receive information from the workload manager defining the ray 510A which intersects the bounding volume 500 illustrated in FIG. 5.

Figure 7:
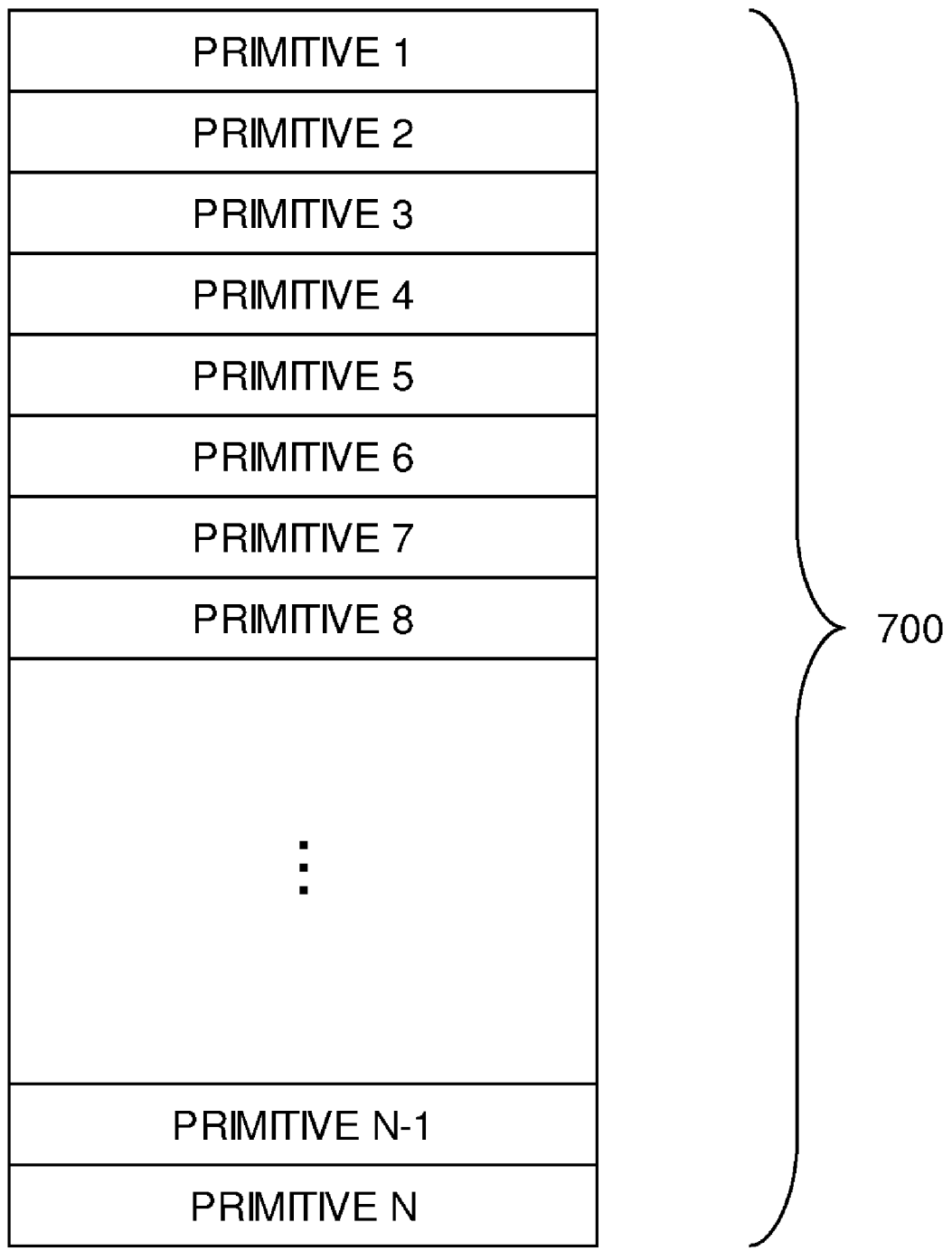
FIG. 7 is an exemplary most recently hit primitive list, according to one embodiment of the invention.

Next, at step 610, the vector throughput engine 210 may run ray-primitive intersection tests to determine if the ray (e.g., ray 510A) intersected any primitives contained with the bounding volume 500 corresponding to the leaf node. According to one embodiment of the invention, the vector throughput engine 210 may use a most recently hit primitive list to determine the order in which to test the ray against the primitives within the bounding volume. For example, FIG. 7 illustrates a most recently hit primitive list 700. As illustrated in FIG. 7 the most recently hit primitive list 700 may contain information which defines each primitive located within the bounding volume 500. The most recently hit list of primitives 700 may be, for example, a list of pointers to memory locations which contain information which defines the primitives, or the most recently hit list of primitives 700 may be a list of information which defines the primitives. The most recently hit list may be stored in an on chip memory cache to improve access time to the information stored in the recently hit list of primitives 700.

When the vector throughput engine 210 determines the first primitive within the most recently hit primitive list 700 the ray intersects, at step 615, the vector throughput engine 210 may fetch the texture corresponding to the intersected primitive, and store the texture. The vector throughput engine 210 may store the texture, for example, in data registers located within the vector throughput engine 210 or in the memory cache 230.

For example, the vector throughput engine 210 may determine that a ray does not intersect the first primitive within the most recently hit list; however, the ray intersects the second primitive within the most recently hit primitive list. Therefore, in step 615, the vector throughput engine 210 may fetch the texture corresponding to the second primitive within the most recently hit primitive list. The vector throughput engine 210 may fetch the texture from, for example, system memory which may take several cycles to complete. As the texture corresponding to the first intersected primitive is being fetched from system memory the vector throughput engine 210 may proceed to step 620 and continue executing ray-primitive intersection tests against primitives according in the order which the primitives are listed in the most recently hit primitive list 700.

According to one embodiment of the invention, the most recently hit primitive list may contain entries for every primitive contained within the bounding volume corresponding to the leaf node. In other embodiments of the invention, the most recently hit primitive list may not contain entries for every primitive contained within the bounding volume corresponding to the leaf node. However, for purposes of this example, the most recently hit primitive list may contain entries for every primitive located within the bounding volume.

After the vector throughput engine 210 is finished executing the ray-primitive intersection tests for all of the primitives contained within the bounding volume the vector throughput engine 210 may proceed to step 625. At step 625, the vector throughput engine 210 may determine if the first primitive which was intersected in the most recently hit primitive list 700 is the same as the first primitive which the ray intersects in the three dimensional scene.

The vector throughput engine 210 may determine the first primitive which the ray intersects in the three dimensional scene by determining the distance from the viewer to each intersected primitive. The shortest distance from the viewer to the point where the ray intersects a primitive will be the first primitive in the three dimensional scene which was intersected by the ray. If the first primitive which was intersected in the most recently hit list is the same as the first primitive which was intersected in the three dimensional scene, then the texture which was fetched in step 615 may be used, in step 640, to determine the color of the pixel through which the ray passed. Thus, in contrast to fetching a texture for a primitive after all of the ray-primitive tests are complete, the pre-fetching of the texture in step 615 may save processing cycles, and therefore time.

However, if at step 625 a determination is made by the vector throughput engine 210 that the first primitive intersected in the most recently hit primitive list is not the same as the first intersected primitive in the three dimensional scene, the vector throughput engine 210 may proceed to step 635. This determination indicates that the pre-fetched texture is not the correct texture for the first intersected primitive in the three dimensional scene. Therefore, at step 635, the vector throughput engine 210 may disregard the pre-fetched texture and fetch the appropriate texture corresponding the first primitive intersected in the three dimensional scene.

When the ray does not intersect the first primitive in the most recently hit primitive list as it intersects in the bounding volume the vector throughput engine 210 may have to fetch the texture from memory in step 635 after all of the ray-primitive intersection tests are finished, and thus there is no benefit in processing cycles from pre-fetching the texture corresponding to the first intersected primitive in the most recently hit primitive list. However, as mentioned previously the likelihood of rays intersecting the same primitive first in the three dimensional scene as in the most recently intersected list may be high due the image processing system following a pattern when issuing rays into the three dimensional scene.

Once the correct texture corresponding to the first intersected ray in the scene has been fetched (i.e., either in step 615 or step 635), the vector throughput engine 210 may proceed to step 640 where the color for the pixel through which the ray passed may be determined based on the texture which was fetched from memory. This color for the pixel may be, for example, the color of the texture at the point where the ray intersects the primitive and thus the texture.

Next at step 645, the most recently hit primitive list may be updated based on the primitives the ray struck in the bounding volume. According to one embodiment of the invention, the most recently hit primitive list may be updated with respect to the first primitive the ray intersected in the bounding volume. According to another embodiment of the invention, the entire most recently hit list may be updated in step 645 based on the order in which the ray struck primitives in the bounding volume. The order in which the ray struck primitives may be derived based on the distances from the viewer to the intersected primitives.

Figure 8:
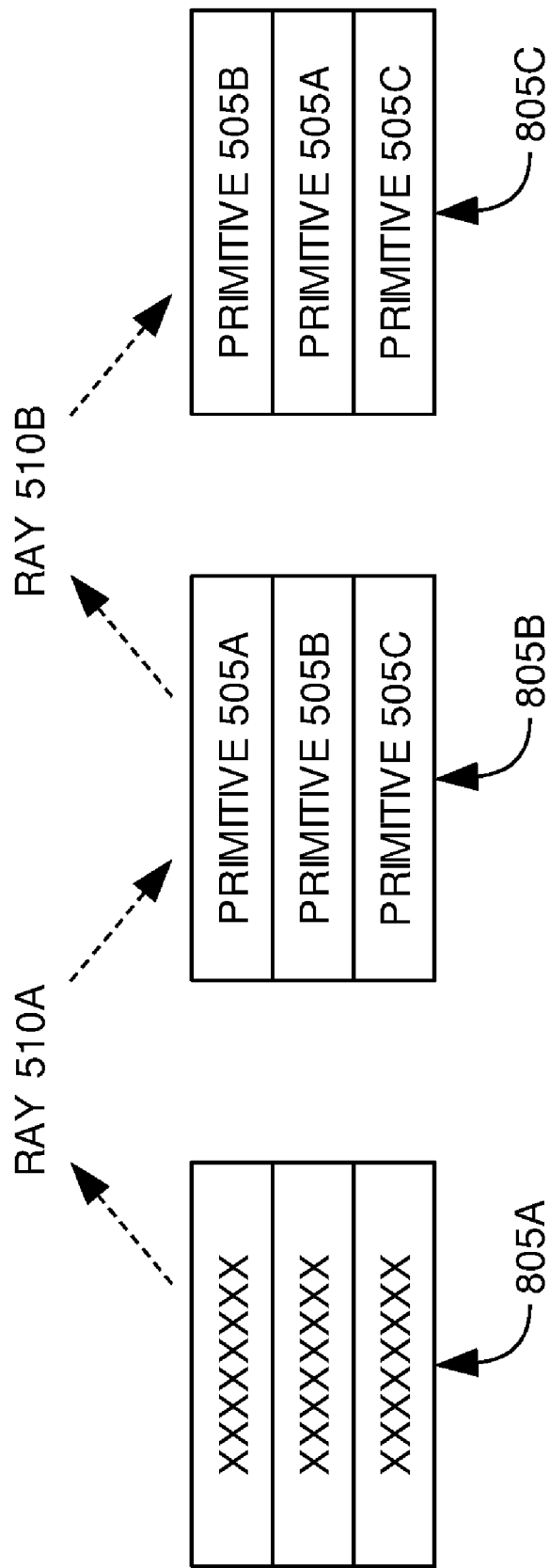
FIG. 8 illustrates a most recently hit primitive list being updated as rays strike primitives within a three dimensional scene, according to one embodiment of the invention.

FIG. 8 illustrates a most recently hit primitive list 805 being updated as rays strike primitives within a three dimensional scene, according to one embodiment of the invention. The rays 510A and 510B used in FIG. 8 are the same rays 510A and 510B illustrated in FIG. 5. As illustrated in FIG. 8, initially the most recently hit primitive list 805A may not be populated with information relating to primitives. This may be due to the fact that no rays have traversed into the bounding volume 500, and therefore no ray-primitive intersection tests have been run to generate primitive ordering information sufficient to populate the most recently hit primitive list 805A. However, according to other embodiments of the invention, the most recently hit primitive list may be pre-populated.

At some time the vector throughput engine 210 may receive information from a workload manager 205 (e.g., in step 605 of method 600) indicating a first ray 510A has been traversed to the leaf node corresponding to the bounding volume 500 in FIG. 5. The vector throughput engine 210 may then perform operations to determine if the ray intersects any of the primitives contained within the bounding volume 500.

For example, as illustrated in FIG. 5, ray 510A may be traversed to the leaf node corresponding to bounding volume 500. Furthermore, ray 510A may strike primitive 505A at point 515A before any other primitives (e.g., 505B and 505C) in the scene. However, as described in method 600, the vector throughput engine 210 may test the ray 510A against all primitives within the bounding volume. After the ray-primitive tests are complete the vector throughput engine 210 may determine the first primitive in the bounding volume 500 which the ray 510A intersected by determine the shortest distance between the viewer of the three dimensional scene and an intersected primitive. As illustrated in FIG. 5, the vector throughput engine will determine that the shortest distance between the viewer of the three dimensional scene and the intersected primitive will be between the viewer and primitive 505A.

Next the vector throughput engine 210 may fetch the texture corresponding to the intersected primitive 505A. The vector throughput engine 210 may then use the texture to determine the color of the texture at the point 515A where the ray 510A intersected the primitive 505A. Furthermore, the color of the primitive 505A at the intersection point 515A may b assigned to the pixel through which the ray passed.

Furthermore, the vector throughput engine 210, as described with regards to method 600, may use the results of the intersection tests to populate the most recently hit primitive list 805A. As illustrated in FIG. 8, after running ray-primitive intersection tests for ray 510A the vector throughput engine 210 has updated the most recently hit primitive list 805A to a new most recently hit primitive list 805B. The most recently hit primitive list 805B now reflects the results of the ray-primitive intersection tests run against ray 510A. Due to the fact that the ray 510A intersected primitive 505A first in the bounding volume 500 and thus the three dimensional scene, primitive 505A is at the top of the most recently hit primitive list 805B. Furthermore, primitive 505B and 505C are in the second and third positions of the most recently hit primitive list 805B to reflect the fact they may have been hit by ray 510A second and third respectively in the three dimensional scene.

Although the most recently hit primitive 805B list has been updated according to the order in which the ray 510A intersected each primitive within the bounding volume 500, according to other embodiments of the invention, the vector throughput engine 210 may only update the most recently hit primitive list with regards to the first primitive the ray 510A intersected in the bounding volume 500 Therefore, according to another embodiment of the invention, the vector throughput engine 210 may only populate the most recently hit primitive list with primitive 505A.

After populating the most recently intersected primitive list 805B, the vector throughput engine 210 may subsequently receive information from the workload manager 205 which contains information defining ray 510B which also intersects bounding volume 500. The vector throughput engine 210 may then execute ray-primitive intersection tests to determine if the ray 510B intersects any primitives 505A-505C contained within the bounding volume 500. As described with reference to method 600 and according to one embodiment of the invention, the vector throughput engine 210 may perform the ray-primitive intersection tests in the order specified in the most recently hit primitive list 805B. Therefore, the vector throughput engine 210 may first determine if the ray 510B intersects primitive 505A. As can be seen in FIG. 5, the results of the ray 510B—primitive 505A intersection test will show that the ray 510B does not intersect the primitive 505A.

However, the vector throughput engine 210 may next perform the ray-primitive intersection tests on the next primitive in the most recently hit primitive list 805B which is primitive 505B. As can be seen in FIG. 5, the results of the ray 510B—primitive 505B intersection test will show that the ray 510B does intersect the primitive 505B at point 515B. This being the first primitive the ray 510B intersected in the most recently hit primitive list 805B, according to embodiments of the invention (e.g., method 600 step 615) the vector throughput engine 210 may perform operations to fetch the texture corresponding to primitive 505B from memory.

While the texture for primitive 505B is being fetched from memory, the vector throughput engine 210 may continue to execute ray-primitive intersection tests for the ray 510B and the remaining primitives in the bounding volume and thus the most recently hit primitive list 805B. Therefore, the vector throughput engine 210 may next perform the ray-primitive intersection tests on the next primitive in the most recently hit primitive list 805B which is primitive 505C. As can be seen in FIG. 5, the results of the ray 510B—primitive 505C will show that the ray 510B does not intersect the primitive 505C.

After the ray 510B—primitive 505C test is finished the vector throughput engine 210 may determine if the ray intersected first in the three dimensional scene corresponds to the first ray intersected in the most recently hit primitive list 805B. Since the ray 510B intersected only the primitive 505B, the primitive first intersected in the most recently hit primitive list 805B is the same as the first primitive intersected in the three dimensional scene. Therefore, the texture fetched after determining that the ray 510B intersected primitive 505B may be used to determine the color of the pixel through which the ray 510 passed. As evidenced by this example, in contrast to waiting until all ray-primitive intersection tests have been completed to fetch the texture associated with the first intersected primitive in the three dimensional scene, fetching the texture associated with the first primitive intersected in a most recently hit primitive list saves processing cycles.

Furthermore, after the vector throughput engine 210 has determined, based on the pre-fetched texture, a color for the pixel through which the ray 510B passed, the vector throughput engine 210 may update the most recently hit primitive list 805B. As illustrated in FIG. 8, due to the fact that the ray 510B did not intersect the primitive 505A, but did intersect the primitive 505B the vector throughput engine 210 may move or relocate primitive 505B higher in the most recently hit primitive list 805C. Therefore, for the next ray that that intersects bounding volume 500 the vector throughput engine 210 will execute ray-primitive intersection tests in the order shown in the most recently hit primitive list 805C.

Conclusion

According to embodiments of the invention, by tracking (in a most recently hit primitive list) the order of primitives intersected by rays in a three dimensional scene or bounding volume, executing future ray-primitive intersection tests in an order according to the order of primitives in the most recently hit primitive list, and pre-fetching a texture which is applied to the first intersected primitive in the most recently hit primitive list, the amount of time necessary to determine the color of the primitive based on the color of the pre-fetched texture at the point a ray intersects a primitive may be reduced. The color of the primitive due to the pre-fetched texture may be used to determine the color of a pixel through which a ray passed, and the pixel may be used to render a two dimensional image from a three dimensional scene. Therefore, by reducing the amount of time to determine the color of a primitive at the point a ray intersects a primitive, the amount of time necessary to render a two dimensional image form a three dimensional scene may be reduced.

While the foregoing is directed to embodiments of the present invention, other and further embodiments of the invention may be devised without departing from the basic scope thereof, and the scope thereof is determined by the claims that follow.

What is claimed is:

1. A method of fetching a texture for primitives in an image processing system, comprising:
   creating, by use of one or more computer processors, a most recently hit primitive list based on a first ray issued into a three dimensional scene, wherein the most recently hit primitive list indicates at least one intersected primitive in the three dimensional scene;
   issuing a second ray into the scene;
   executing ray-primitive intersection tests on the second ray in an order according to the most recently hit primitive list;
   pre-fetching a first texture corresponding to the first primitive in the most recently hit primitive list intersected by the second ray;
   upon determining that the first primitive intersected by the second ray in the most recently hit primitive list is the first primitive intersected by the second ray in the three dimensional scene, determining the color of a pixel through which the second ray passed based on the first texture that was previously prefetched.

2. The method of claim 1, further comprising:
   upon determining that the first primitive intersected by the second ray in the most recently hit primitive list is not the first primitive intersected by the second ray in the three dimensional scene:
      fetching a second texture corresponding to the first primitive intersected by the second ray in the three dimensional scene; and
      determining the color of a pixel through which the second ray passed based on the second texture.

3. The method of claim 1, further comprising:
   updating the most recently hit primitive list based on the order of primitives intersected by the second ray in the three dimensional scene.

4. The method of claim 1, wherein the most recently hit primitive list comprises information defining each primitive contained within a bounding volume, and the bounding volume encloses at least a portion of the three dimensional scene.

5. The method of claim 1, wherein creating the most recently hit primitive list comprises:
   determining distances from a view point of the three dimensional scene to each primitive intersected by the first ray; and
   ordering the primitives intersected by the first ray according to the distances.

6. The method of claim 1, wherein the most recently hit primitive list is stored within a memory cache.

7. A computer readable medium containing a program which, when executed, performs an operation, comprising:
   creating a most recently hit primitive list based on a first ray issued into a three dimensional scene, wherein the most recently hit primitive list indicates at least one intersected primitive in the three dimensional scene;
   issuing a second ray into the scene;
   executing ray-primitive intersection tests on the second ray in an order according to the most recently hit primitive list;
   pre-fetching a first texture corresponding to the first primitive in the most recently hit primitive list intersected by the second ray;
   upon determining if the first primitive intersected by the second ray in the most recently hit primitive list is the first primitive intersected by the second ray in the three dimensional scene, determining the color of a pixel through which the second ray passed based on the first texture that was previously prefetched.

8. The computer readable medium of claim 7, wherein the operation further comprises:
   upon determining that the first primitive intersected by the second ray in the most recently hit primitive list is not the first primitive intersected by the second ray in the three dimensional scene:
      fetching a second texture corresponding to the first primitive intersected by the second ray in the three dimensional scene; and
      determining the color of a pixel through which the second ray passed based on the second texture.

9. The computer readable medium of claim 7, wherein the operation further comprises:
   updating the most recently hit primitive list based on the order of primitives intersected by the second ray in the three dimensional scene.

10. The computer readable medium of claim 7, wherein the most recently hit primitive list comprises information defining each primitive contained within a bounding volume, and the bounding volume encloses at least a portion of the three dimensional scene.

11. The computer readable medium of claim 7, wherein creating the most recently hit primitive list comprises:
    determining distances from a view point of the three dimensional scene to each primitive intersected by the first ray; and
    ordering the primitives intersected by the first ray according to the distances.

12. The computer readable medium of claim 7, wherein the most recently hit primitive list is stored within a memory cache.

13. An image processing system comprising:
    a memory cache; and
    a first processing configured to perform the steps comprising:
       creating a most recently hit primitive list in the memory cache based on a first ray issued into a three dimensional scene, wherein the most recently hit primitive list indicates at least one intersected primitive in the three dimensional scene;
       issuing a second ray into the scene;
       executing ray-primitive intersection tests with the second ray in an order according to the most recently hit primitive list;
       pre-fetching a first texture corresponding to the first primitive in the most recently hit primitive list intersected by the second ray; and
       upon determining that the first primitive intersected by the second ray in the most recently hit primitive list is the first primitive intersected by the second ray in the three dimensional scene, determining the color of a pixel through which the second ray passed based on the first texture that was previously prefetched.

14. The system of claim 13, wherein the first processing element is further configured to perform the steps comprising:
    upon determining that the first primitive intersected by the second ray in the most recently hit primitive list is not the first primitive intersected by the second ray in the three dimensional scene, fetching a second texture corresponding to the first primitive intersected by the second ray in the three dimensional scene, and determining the color of a pixel through which the second ray passed based on the second texture.

15. The system of claim 13, wherein the first processing element is further configured to perform the step comprising:
updating the most recently hit primitive list based on the order of primitives intersected by the second ray in the three dimensional scene.

16. The system of claim 13, wherein the most recently hit primitive list comprises information defining each primitive contained within a bounding volume, and the bounding volume encloses at least a portion of the three dimensional scene.

17. The system of claim 13, wherein creating the most recently hit primitive list comprises:
determining distances from a view point of the three dimensional scene to each primitive intersected by the first ray; and
ordering the primitives intersected by the first ray according to the distances.

* * * * *